United States Patent [19]
Drumright et al.

[11] Patent Number: 5,807,962
[45] Date of Patent: Sep. 15, 1998

[54] AROMATIC SULFONATED DIESTER MONOMER, PROCESS TO SYNTHESIZE, POLYMER DERIVED THEREFROM AND METHOD TO PREPARE SAID POLYMER

[75] Inventors: Ray E. Drumright; Michael J. Mullins; William B. Marshall, all of Midland, Mich.; Edvins L. Daiga, Toledo, Ohio

[73] Assignee: The Dow Chemical Company, Midland, Mich.

[21] Appl. No.: 915,364

[22] Filed: Aug. 20, 1997

Related U.S. Application Data

[62] Division of Ser. No. 519,374, Aug. 25, 1995, Pat. No. 5,674,968.

[51] Int. Cl.$^6$ .............................. C08G 63/68; C08K 3/24; C08L 67/02
[52] U.S. Cl. ...................... 528/173; 528/171; 528/180; 528/194; 528/293; 528/295; 528/373; 528/487
[58] Field of Search ..................................... 528/173, 171, 528/180, 194, 293, 295, 373, 487

[56] References Cited

U.S. PATENT DOCUMENTS

| | | | |
|---|---|---|---|
| 3,959,561 | 5/1976 | Walles | 428/412 |
| 4,195,156 | 3/1980 | Bruckdorfer | 528/171 |
| 4,316,838 | 2/1982 | Tokuda | 260/45.95 |
| 4,403,087 | 9/1983 | Mark | 528/196 |
| 4,469,860 | 9/1984 | Rosenquist | 528/196 |
| 5,097,002 | 3/1992 | Sakashita et al. | 528/199 |
| 5,097,005 | 3/1992 | Tietz | 528/272 |
| 5,227,456 | 7/1993 | Shepherd et al. | 528/173 |

FOREIGN PATENT DOCUMENTS

| | | | |
|---|---|---|---|
| 0213466 | 3/1987 | European Pat. Off. . | |
| H7228676 | 8/1995 | Japan | C08G 63/64 |

OTHER PUBLICATIONS

Degee et al., *Synthesis and Characterization of Halato–Telechelic Bisphenol–A Polycarbonates*, Polymer, vol. 35, No. 2, pp. 371–376 (1994).

*Primary Examiner*—Duc Truong

[57] ABSTRACT

A sulfonated dicarboxylic acid and a diaromatic carbonate are reacted by a solution process to form a sulfonated aromatic diester such as diphenyl sodium 5-sulfoisophthalate. The sulfonated aromatic diester is reacted with an aromatic polymer precursor mixture such as bisphenol A and diphenyl carbonate, polymer or combination thereof, at a temperature above the melting point of the polymer or a member of the aromatic polymer precursor to form a randomly positioned sulfonated aromatic moiety in a polymer chain of a thermoplastic non-crosslinked aromatic polymer such as a linear polycarbonate.

10 Claims, No Drawings

AROMATIC SULFONATED DIESTER MONOMER, PROCESS TO SYNTHESIZE, POLYMER DERIVED THEREFROM AND METHOD TO PREPARE SAID POLYMER

CROSS-REFERENCE TO RELATED APPLICATION

This is a divisional of application Ser. No. 08/591,374 filed Aug. 25, 1995 now U.S. Pat. No. 5,674,968.

FIELD OF THE INVENTION

The present invention relates to the synthesis of a novel aromatic sulfonated diester; the use of the diester in the production of an aromatic polymer having an anionic sulfonated aromatic moiety, in particular, the production of a thermoplastic aromatic polycarbonate having said ionic moiety.

BACKGROUND OF THE INVENTION

An improvement in fire resistance is known to occur with the addition of sulfonated aromatic compounds to polycarbonate (U.S. Pat. No. 3,978,024). Non-Newtonian melt rheology is an advantage in forming polycarbonate articles by such techniques as blow molding and profile extrusion. Typically, non-Newtonian melt rheology of a polycarbonate has been achieved by branching the polycarbonate. Polycarbonate made by a method attempting to terminate a polycarbonate with sulfonated aromatic end-caps has been described and has led to a slight non-Newtonian melt rheology (U.S. Pat. No. 4,469,860). In the polycarbonate preparation method of U.S. Pat. No. 4,469,860, a basic aqueous interfacial polymerization is described. The patent describes emulsion formation and states this should be avoided when attempting to terminate the linear aromatic polycarbonate with aromatic sulfonate groups.

In addition, Degee et al., *Polymer*, 35, (2), pp. 371–376, attempted to terminate an aromatic polycarbonate by an aqueous interfacial process using a 4-hydroxybenzenesulfonic acid. Degee et al. determined that no termination by a sulfonic acid/salt moiety resulted in the process and speculated that this is due to instability of the sulfonated ester end-cap in the presence of aqueous base resulting in a polycarbonate product which is terminated by a phenoxide moiety instead of a sulfonic acid/salt moiety.

Therefore, it would be desirable to provide a polycarbonate having excellent fire resistance and non-Newtonian melt rheology.

SUMMARY OF THE INVENTION

A first aspect of this invention is a sulfonated aromatic diester represented by the structure:

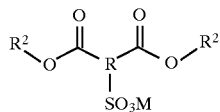

wherein R is an aromatic group, each $R^2$ group is independently an aryl group and M is selected from the group consisting of hydrogen, an alkali metal, an alkaline earth metal, a quaternary nitrogen group, a quaternary phosphorus group and zinc.

The ester group of this sulfonated aromatic diester can engage in a transesterification reaction with an aromatic polymer precursor mixture, polymer or combination thereof, resulting in a randomly positioned sulfonated aromatic moiety in a polymer chain of a thermoplastic non-crosslinked aromatic polymer (hereinafter referred to as a sulfonated ionic aromatic polymer). The aromatic polymer precursor can be any difunctional aromatic compound or compounds which under proper conditions can react by a transesterification reaction to form a linear aromatic polymer that is thermoplastic. The aromatic polymer precursor may also be comprised of a small quantity of a trihydric and/or tetrahydric phenol compound, as illustrated by the trihydric and/or tetrahydric phenols described in U.S. Pat. No. 3,544,514, to prepare a randomly branched polymer of this invention which is still thermoplastic. In other words, the quantity of tri- or tetrahydric compounds must not be present in a quantity that causes crosslinking.

A second aspect of this invention is a process comprising reacting a mixture of at least one sulfonated dicarboxylic acid having the structure:

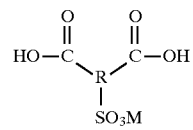

and at least one diaromatic carbonate having the structure:

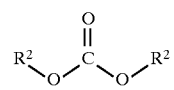

in which at least one sulfonated aromatic diester represented by the structure:

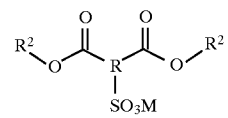

is formed, wherein R is an aromatic group, each $R^2$ group is independently an aryl group and M is selected from the group consisting of hydrogen, an alkali metal, an alkaline earth metal, a quaternary nitrogen group, a quaternary phosphorus group and zinc.

A third aspect of this invention is a process comprising reacting a mixture of at least one sulfonated aromatic diester and at least one aromatic polymer precursor mixture or polymer, each having transesterifiable groups, at a temperature above the melting point of the polymer or a member of the precursor mixture and at a pressure at most equal to atmospheric pressure forming a sulfonated ionic aromatic polymer having a randomly positioned sulfonated aromatic moiety in a polymer chain of said sulfonated ionic aromatic polymer.

A fourth aspect of this invention is a sulfonated ionic aromatic polycarbonate comprising a plurality of polycarbonate polymer chains, wherein at least one chain has a randomly positioned sulfonated aromatic moiety. The sulfonated ionic aromatic polycarbonate can be made using the novel diester and polymerization process of this invention and may have a branched or linear stucture.

The sulfonated ionic aromatic polycarbonate of this invention displays advantageous characteristics such as excellent melt strength (high viscosity at low shear), increased solvent resistance (at most partially soluble in methylene chloride after 24 hours at room temperature) and excellent flame resistance without segregation of a flame retardant additive to the surface of a formed article during processing.

DETAILED DESCRIPTION OF THE INVENTION

The sulfonated aromatic diesters of this invention are represented by:

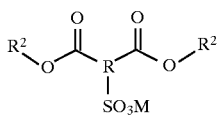

wherein R is any aromatic group including an aryl or any heterocyclic aromatic group such as a substituted pyridinium group. R may have substituent groups in addition to those explicitly shown in the above structure. Preferably R is a benzene ring. Each $R^2$ group is independently an aryl group such as phenyl, naphthyl, cumenyl, mesityl, tolyl and xylyl. $R^2$ is preferably phenyl. M is as described hereinabove. Preferably M is lithium, sodium, potassium, magnesium, calcium, zinc, a quaternary nitrogen group, a quaternary phosphorus group or hydrogen. Most preferably M is sodium. Preferably the sulfonated aromatic diester is at least partially miscible, and more preferably completely miscible in a member of the aromatic polymer precursor mixture or polymer at a temperature above the melting point of the member or polymer. A most preferred sulfonated aromatic diester is diphenyl sodium 5-sulfoisophthalate.

The sulfonated aromatic diester can be formed by reacting a sulfonated dicarboxylic acid and a diaromatic carbonate. The reaction is advantageously performed in solution as described below. The sulfonated dicarboxylic acid is represented by the structure:

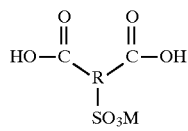

wherein R and M are as described before.

The diaromatic carbonate is represented by the structure:

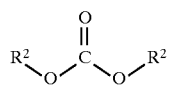

wherein $R^2$ is as described before. Preferably the sulfonated dicarboxylic acid is sodium 5-sulfoisophthalic acid and the diaromatic carbonate is diphenyl carbonate.

In the preparation of a sulfonated diaromatic ester by a solution process, at least one sulfonated aromatic dicarboxylic acid and at least one diaromatic carbonate are dissolved in a polar aprotic solvent and, subsequently, reacted in the solvent by heating the solution to a temperature as described hereinafter for a time sufficient to carry out the reaction. Any polar aprotic solvent or mixture of aprotic solvents may be used as long as the solvent solubilizes the sulfonated dicarboxylic acid and the diaromatic carbonate. Polar aprotic solvents such as N,N-dimethylformamide (DMF), N,N-dimethylacetimide, N-methylpyrrolidinone, and 1,1,3,3-tetramethylurea may be used. Preferably the reaction of the sulfonated dicarboxylic acid and diaromatic carbonate is also carried out in the presence of a basic catalyst. Basic catalysts such as tributylamine, triethylamine, trimethylamine, 4-N,N-dimethylaminopyridine, 2,2,6,6-tetramethyl piperidine, 1,2-dimethylimidazole, 1-methyl-2-phenyliminopyrrolidine, N,N-dibutyl-N'-phenyl-o-methylisourea, 1-aza-2-methoxy-1-cycloheptene, t-butyl-cyclohexyliminoacetate and a quaternary ammonium compound may be used. An optimal quantity of catalyst sufficient to decrease the time or increase conversion of the reaction relative to reacting without catalyst is readily determinable by one of ordinary skill in the art and is preferred to be as small a quantity as possible. The sulfonated diaromatic ester can be formed by heating said solution between 80° C. to 250° C. for a time sufficient to react the sulfonated carboxylic acid and diaromatic carbonate. Preferably the reaction is carried out between 100° C. to 200° C., and most preferably between 120° C. to 160° C. By-products and solvent may be removed by any convenient means such as distillation, evaporation, filtration, extraction, recrystallization and combination thereof.

The sulfonated ionic aromatic polymer of this invention can be formed by reacting the sulfonated aromatic diester of this invention with an aromatic polymer precursor mixture or polymer, each having transesterifiable groups. Transesterifiable groups are defined herein as chemical groups which can react by a transesterification reaction forming ester or carbonate linkages. They include groups such as an ester and carbonate. The reaction of the sulfonated aromatic diester with an aromatic polymer results in a polymer having a sulfonated aromatic moiety having the following structure:

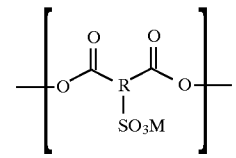

wherein R and M are described hereinbefore. The thermoplastic aromatic polymer which may incorporate an aromatic sulfonated diester moiety of this invention in the polymer chain may include, but are not limited to polycarbonate and polyesters including polyester, polyestercarbonate, polyarylate, polyethylene terephthalate, polybutylene terephthalate and polyester-ether. Preferably the thermoplastic aromatic polymer is an aromatic polycarbonate. The quantity of sulfonated aromatic moiety can be at least about 0.01, preferably about 0.25, and more preferably about 1, up to about 25, preferably up to about 15, and more preferably up to about 10 weight percent of the sulfonated ionic aromatic polymer.

In the process of this invention for preparing a sulfonated ionic aromatic polymer, a sulfonated aromatic diester of this invention is reacted with a polymer precursor mixture or polymer. To form a polyester having a sulfonated aromatic group, a polyester precursor mixture of an aromatic or aliphatic dicarboxylic acid or its acid chloride and a dihydric compound such as a diol and diphenol is reacted with the sulfonated aromatic diester of this invention. The dicarboxylic acid or acid chloride may include the following acids or their corresponding acid chlorides: terephthalic acid, isophthalic acid, naphthalenedicarboxylic acid, diphenyletherdicarboxylic acid, diphenyldicarboxylic acid, diphenylsulfonedicarboxylic acid, diphenoxyethanedicarboxylic acid and the like.

The dihydric compound and more specifically a diol suitable for preparation of a polyester of this invention includes, for example, ethylene glycol, 1,3-propylene glycol, 1,4-butanediol, 1,5-pentanediol, 1,6-hexanediol and cyclohexane dimethylol. Preferred aliphatic diols for preparation of polyesters according to the process of the present invention are ethylene glycol and 1,3-propylene glycol and the dihydroxy compounds described hereinafter. The polyester precursor mixture is preferably reacted with the sulfonated aromatic diester of this invention by a melt process described below for forming a sulfonated ionic aromatic polycarbonate.

A polyester polymer which can be used to react and make a polyester containing a sulfonated aromatic moiety of this invention can be made by reacting the above described polyester precursor mixture by methods such as melt, solution and interfacial processes described in, for example, the *Encyclopedia of Polymer Science and Engineering*, Vol. 12, "Polyesters", p. 1 et. seq. (1987); *High Performance Polymers: Their Origin and Development*, "History of Polyarylates", pp. 95 to 103 (1986); U.S. Pat. Nos. 2,465,319; 3,047,539; 3,216,970; 3,756,986; 3,946,091; 4,049,629 and 4,137,278, all of which are incorporated herein by reference. In particular, U.S. Pat. Nos. 4,137,278 and 3,946,091 disclose melt polymerization techniques; U.S. Pat. Nos. 4,049,629 and 3,946,091 disclose solution polymerization techniques and U.S. Pat. Nos. 3,946,091 and 3,216,970 disclose interfacial polymerization techniques, which techniques could preferably be employed to prepare polyester (herein meaning a resin of polyester) to be reacted with the sulfonated aromatic diester of this invention. Preferably the polyester is reacted by a melt process as described below for forming a sulfonated ionic aromatic polycarbonate.

To form a sulfonated ionic aromatic polycarbonate of this invention, a sulfonated aromatic diester is reacted with an aromatic polycarbonate precursor mixture or polycarbonate polymer. The sulfonated aromatic polycarbonate of this invention will have ester linkages to the sulfonated aromatic moiety. The aromatic polycarbonate precursor mixture is an aromatic dihydroxy compound and an aromatic diester of a carbonic acid described hereinafter.

An aromatic diester of a carbonic acid which can be used to make a sulfonated ionic aromatic polycarbonate include aromatic diesters of a carbonic acid represented by the structure:

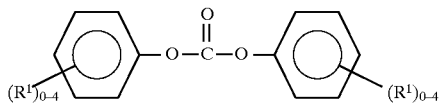

wherein each $R^1$ is independently alkyl, alkoxy, aryl, aryloxy or $NO_2$. Preparation of such a diester is described in U.S. Pat. No. 4,182,726, incorporated herein by reference. An aromatic diester of a carbonic acid containing a chlorine species such as phosgene is not a practical carbonate precursor in the melt process of this invention because of the formation of HCl and the difficulty of removing said HCl from the reaction.

Examples of some dihydroxy compounds suitable for the preparation of the sulfonated ionic aromatic polycarbonate of this invention include variously bridged, substituted or unsubstituted aromatic diols (or mixtures thereof) represented by the formula:

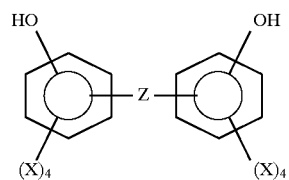

wherein:
(I) Z is (A) a divalent radical, of which all or different portions can be aliphatic or aromatic, said divalent or tetravalent radical being composed of 1–35 carbon atoms together with up to five oxygen, nitrogen, sulfur, phosphorous and/or halogen (such as fluorine, chlorine and/or bromine) atoms; or (B) S, $S_2$, SO, $SO_2$, O or CO; or (C) a single bond; and
(II) each X is independently hydrogen, a halogen (such as fluorine, chlorine and/or bromine), a $C_1$–$C_{12}$ linear or cyclic alkyl, alkoxy, aryl or aryloxy radical, such as methyl, ethyl, isopropyl, cyclopentyl, cyclohexyl, methoxy, ethoxy, benzyl, tolyl, xylyl, phenoxy and/or xylynoxy.

For example, the bridging radical represented by Z in the above formula can be a carbon atom to which is bonded one or more groups such as $CH_3$, $C_2H_5$, $C_3H_7$, n-$C_3H_7$, i-$C_3H_7$, cyclohexyl, bicyclo[2.2.1]heptyl, benzyl, $CF_2$, $CF_3$, $CCl_3$, $CF_2Cl$, CN, $(CH_2)_2COOCH_3$ or $PO(OCH_3)_2$. The dihydroxy compound may also be a compound such as 9,9-bis[4-hydroxyphenyl]fluorene.

An aromatic polycarbonate which can be reacted with the sulfonated aromatic diester of this invention to form a sulfonated ionic aromatic polycarbonate can be any polycarbonate derived from a carbonate precursor such as a disubstituted carbonic acid derivative (e.g., phosgene and the previously described aromatic diester of a carbonic acid), a haloformate (e.g., a bishaloformate of glycol or dihydroxy benzene), a carbonate ester and a previously described dihydroxy compound. The aromatic polycarbonate can be made by any process such as a phase boundary process (i.e., interfacial polymerization) in which the dihydroxy compound is dissolved and deprotonated in an aqueous alkaline solution and the carbonate precursor is dissolved in an aqueous immiscible organic solvent and subsequently reacted, a melt process (i.e., transesterification process), a nonaqueous solution process and/or polymerization of cyclic oligomers. The methods for preparing aromatic polycarbonate are discussed in greater detail in Schnell, U.S. Pat. No. 3,028,365; Glass, U.S. Pat. No. 4,529,791; and Grigo, U.S. Pat. No. 4,677,162, each being incorporated herein in its entirety.

The reaction of an aromatic polycarbonate precursor mixture (i.e., an aromatic diester of carbonic acid and a dihydroxy compound) with the sulfonated aromatic diester to form a sulfonated ionic aromatic polycarbonate is advantageously performed at a temperature above the melting point of a constituent of the mixture using a melt polycarbonate polymerization method described in U.S. Pat. Nos. 4,182,726; 4,452,968 and 4,954,613, which are incorporated herein by reference. The reaction is preferably performed in the presence of a basic catalyst such as lithium hydroxide, sodium hydroxide, sodium methylate, sodium bisphenolate, calcium acetate, phenyl benzoate, N-stearylpheno-thiazine, quaternary ammonium chloride, an alkaline-(hydroxy) fluoroborate, an alkali metal salt of benzoic acid, an iminocarboxylic acid and a basic metal oxide such as zinc, lead and antimony oxide. An optimal quantity of catalyst sufficient to more effectively carry out the reaction relative to reacting without catalyst is readily determinable by one of ordinary skill in the art and is preferred to be as small a quantity as possible. A sufficient quantity of sulfonated aromatic diester is reacted to form the previously described sulfonated ionic aromatic polymer.

Typically, the reaction of the aromatic polycarbonate precursor mixture and sulfonated aromatic diester is carried out by heating to about 100° C. to about 350° C. and reducing the pressure sequentially from atmospheric pressure (about 760 millimeters of mercury) for a time sufficient to at least partially react the sulfonated aromatic diester forming a sulfonated ionic aromatic polycarbonate. The reduced pressure is believed to preferentially remove by evaporation an aryl alcohol such as phenol furthering the polymerization of the aromatic dihydroxy and aromatic diester (i.e., increases molecular weight). Preferably the maximum reaction temperature is about 150° C. to about 300° C. Most preferably the maximum reaction temperature is about 175° C. to about 300° C. The pressure at the highest reaction temperature ranges from about 0.001 to about 100 millimeters of mercury. The pressure at the maximum reaction temperature is preferably at most 10 millimeters of mercury, and most preferably at most 1 millimeter of mercury. The gaseous atmosphere over the reaction is preferably an inert gas such as nitrogen and argon.

The reaction of an aromatic polycarbonate polymer at a temperature above its melting point with the sulfonated aromatic diester is preferably performed in the presence of a basic catalyst and a quantity of sulfonate aromatic diester as described for the process having a polycarbonate precursor mixture. The reaction conditions are also the same as described above for the reaction employing a polycarbonate precursor mixture.

After the reaction to form the sulfonated ionic aromatic polycarbonate, the sulfonated ionic aromatic polycarbonate may be crystallized in a non-solvent such as acetone, acetone-water mixture, toluene and isopropanol, isolated by a method such as filtration, dried and heated under vacuum in a solid state to further the polymerization reaction by distilling off an aryl alcohol such as phenol. The temperature is preferably as high as possible but below the melt temperature of the sulfonated ionic aromatic polycarbonate and may be raised sequentially as the reaction progresses, which causes an increase in molecular weight and, hence, a melt temperature increase of the crystallized sulfonated ionic aromatic polycarbonate. The time of reaction is any time sufficient to create a sulfonated ionic aromatic polymer having desirable properties. Flowing inert gas such as argon may also be used to facilitate the removal of the aryl alcohol.

A most preferred embodiment of this invention is the formation of a sulfonated ionic aromatic polycarbonate from the reaction of bisphenol A, diphenyl carbonate and diphenyl sodium 5-sulfoisophthalate using the reaction process described herein.

The solubility in a chlorinated solvent such as methylene chloride of a thermally moldable linear sulfonated ionic aromatic polycarbonate of this invention having metal salt sulfonated aromatic moieties can advantageously be reduced compared to a linear aromatic polycarbonate of similar molecular weight without sulfonated aromatic moieties. For examples the solubility of a methylene chloride miscible linear aromatic polycarbonate can be advantageously made slightly miscible to essentially immiscible by substituting metal salt sulfonated aromatic moities into the chains of the polycarbonate. The level of solubility depends on and is proportional to the quantity of metal salt sulfonated aromatic moieties present in the chains of the polycarbonate. For example, the solubility can range from completely miscible to essentially immiscible in methylene chloride after 24 hours at about 20° C. and a polycarbonate solute concentration of about 1 to about 50 volume percent. Preferably about 67, more preferably about 33, and most preferably essentially 0 volume percent of the moldable polycarbonate is dissolved in methylene chloride after 24 hours at a polycarbonate solute concentration of about 10 to 30 volume percent and temperature of about 20° C.

Since the sulfonated aromatic polycarbonates of this invention are thermoplastic, they can be formed by any convenient thermal process such as extrusion, injection molding and blow molding. The sulfonated aromatic polycarbonates of this invention can advantageously be used in applications requiring solvent resistance and thermal processing methods. The sulfonated aromatic carbonates of this invention can be used in an engineering thermoplastic application such as automotive exterior molding, glaze, clear medical container or tubing, appliance interior or exterior element and computer housing.

Test Methods

The test methods used in the following examples are as follows.

The DTUL (Deflection-Temperature-Under-Load) value of a polycarbonate is determined at 264 psi (1820 KPa) using the method described in ASTM D 684.

The Vicat value of a polycarbonate is determined by the method described in ASTM D 1525.

Dynatup impact testing value of a polycarbonate is determined at 23° C. using a 138.5 pound weight dropped 12 inches as described in ASTM D 3763-86.

The polycarbonate tensile properties, tensile strength, tensile yield stress, elastic modulus, elongation at break and yield are determined by ASTM D 638 test method employing an Instron 1125 testing rig using a cross head speed of 0.2 inch/min and a 5000 pound load cell.

The polycarbonate inherent viscosity as described in *Preparative Methods of Polymer Chemistry*, W. R. Sorenson and T. W. Campbell, 1961, p. 35, is determined at 25° C. in 65 weight percent methylene chloride ($CH_2Cl_2$)/35 weight percent trifluoroacetic acid $CF_3CO_2H$ solution at a polycarbonate concentration of 0.5 gram/deciliter.

Polymer melting points are obtained by using a Dupont Model 2910 Differential Scanning Calorimeter (DSC). Samples are heated under air at 20° C./min to 300° C. The melt is cooled and rerun under the same conditions above and the glass transition temperature ($T_g$) is determined by the inflection point of the baseline shift from the second run. The melting point is determined from the maximum of the endothermic peak of the first DSC run.

Proton and carbon nuclear magnetic resonance (NMR) of the sulfonated aromatic diesters and polycarbonates are obtained using a Varian VXR-300 NMR instrument in either dimethyl sulfoxide (DMSO-$d_6$) or 65 weight percent $CDCl_3$/35 weight percent $CF_3CO_2D$ solution using a tetramethylsilane reference. About a 5 weight percent sample concentration is used.

Below are specific examples within the scope of the invention and comparative examples of the prior art. The specific examples are for illustrative purposes only and in no way limit the invention described herein.

EXAMPLE 1

Preparation of Diphenyl Sodium 5-Sulfoisophthalate

A 3 neck 5000 mL flask is filled with 300.0 g (1.12 mol) of sodium 5-sulfoisophthalic acid, 1195.6 g (5.58 mol) of diphenyl carbonate, 103.6 g (0.558 mol) of tributylamine, 2.7 g (0.022 mol) of 4-dimethylaminopyridine and 1.5 L of N,N-dimethylformamide. The heterogeneous reaction mixture is stirred at 200 rpm under a nitrogen atmosphere and heated to 140° C. After 24 hours at 140° C. the reaction mixture has become clarified. The reaction mixture is cooled and concentrated by rotary evaporation at 100° C., yielding a molten mixture which solidifies upon cooling. The solid is placed in a Waring™ blender and extracted with 3 L of diethyl ether, filtered and the extraction repeated. The filter cake is air dried to remove ether and then the product is dissolved in 12 L of water at 75° C. The aqueous solution is cooled to 65° C. and 45 mL of 0.5M sodium bicarbonate solution is added to increase the pH of the solution from 5 to 6. The aqueous solution is filtered hot, cooled to room temperature and then placed in a refrigerator overnight. Filtration of the recrystallized product and vacuum drying at 120° C. for 5 hours yields 373.5 g of diphenyl sodium 5-sulfoisophthalate determined by $^1$H NMR. The melting point of the diphenyl sodium 5-sulfoisophthalate is 305° C.

EXAMPLE 2

Preparation of a Polycarbonate With 1 Mole Percent Diphenyl Sodium 5-Sulfoisophthalate Added to the Initial Reaction Mixture A 3 liter 316 stainless steel reaction kettle is filled with diphenyl carbonate (1098 g, 5.125 moles), bisphenol A (1125 g, 4.928 moles) and diphenyl sodium 5-sulfoisophthalate (21.02 g, 0.0500 mole). The mole percent of diphenyl sodium 5-sulfoisophthalate is equivalent to 1 mole percent of the combined moles of bisphenol A and diphenyl sodium 5-sulfoisophthalate. The reaction apparatus is evacuated and purged with nitrogen three times. The contents of the reactor are heated to 220° C. then 2 mL of 0.128M aqueous LiOH is added to the stirred, homogeneous reaction liquid at 760 mm Hg nitrogen pressure. The reactor pressure is reduced at a rate of 20 mm Hg/min until 30 mm Hg is reached. The pressure is then reduced at a rate of 5 mm Hg/min until a vacuum of less than 0.5 mm Hg is attained. The reaction temperature is increased to 280° C. and maintained for 15 minutes at the 0.5 mm Hg vacuum. The vacuum is released and the reaction vessel is pressurized to 850 mm Hg with nitrogen. The transparent polymer melt is discharged from a port located at the bottom of the reactor. The melt strand is passed through a water bath and chopped to give 1000 g of pellets. The polymer has an inherent viscosity of 0.346 dL/g and a $T_g$ of 144.2° C.

Essentially all of the sulfonated aromatic diester has been reacted, as determined by $^{13}$C NMR, forming sulfonated aromatic moieties in the polymer chains.

The polymer is crystallized by mixing in 2.5 L of acetone for 2 hours. The crystalline polymer is collected by filtration and dried. The onset of melting occurs at 188.3° C. (18.9 J/g) and the peak of the melting endotherm is broad and located at 218.6° C.

EXAMPLE 3

Vacuum and Heat Treatment of Example 2 Polycarbonate

About 300 grams of crystalline polymer described in Example 2 is tumbled under vacuum (about 0.04 mm Hg) and heated from 180° C. to 220° C. at 5° C. per hour and then held at 220° C. for 9 hours yielding a polymer with an inherent viscosity of 0.54 dL/g and a $T_g$ of 154° C. The onset of melting occurs at 252° C. (27 J/g) and the peak of the endotherm is narrow and located at 254° C.

EXAMPLE 4

Vacuum and Heat Treatment of Example 2 Polycarbonate

About 300 grams of the crystalline polymer described in Example 2 is tumbled under vacuum (about 0.04 mm Hg) and heated isothermally at 190° C. for 23 hours yielding a polymer with an inherent viscosity of 0.43 dL/g and a $T_g$ of 151° C. The onset of melting occurs at 230° C. (27 J/g) and the peak of the endotherm is narrow and located at 236° C.

EXAMPLE 5

Preparation of a Polycarbonate With 1 Mole Percent Diphenyl Sodium 5-Sulfoisophthalate Added to the Initial Reaction Mixture Using the method described in Example 2, a polymer is made except that, before dumping the reactor, 1 mL of 0.264M aqueous phenyl phosphonic acid is added to deactivate the basic catalyst. The polymer has an inherent viscosity of 0.377 dL/g and a $T_g$ of 147° C.

The polymer is crystallized by mixing in 1.5 L of acetone for 2 hours. The crystalline polymer is collected by filtration and dried. The onset of melting occurs at 209° C. (20.4 J/g) and the peak of the endotherm is broad and located at 220° C.

EXAMPLE 6

Vacuum and Heat Treatment of Example 5 Polycarbonate

About 300 grams of the crystallized polymer described in Example 5 is tumbled and heated isothermally at 190° C. for 23 hours under vacuum (about 0.04 mm Hg) yielding a polymer with an inherent viscosity of 0.50 dL/g and a $T_g$ of 151° C. The onset of melting occurs at 237° C. (23 J/g) and the peak of the endotherm is narrow and located at 244° C.

EXAMPLE 7

Vacuum and Heat Treatment of Example 5 Polycarbonate

About 300 grams of the crystalline polymer described in Example 5 is tumbled under vacuum (about 0.04 mm Hg) and heated from 180° C. to 220° C. at 5° C. per hour and then held at 220° C. for 9 hours making a polymer with an inherent viscosity of 0.70 dL/g and a $T_g$ of 154° C. The onset of melting occurs at 263° C. (32 J/g) and the peak of the endotherm is narrow and located at 270° C.

EXAMPLE 8

Preparation of a Polycarbonate With 0.5 Mole Percent Diphenyl Sodium 5-Sulfoisophthalate Added to the Initial Reaction Mixture A polycarbonate is made using the procedure described in Example 2, except that only 0.5 mole percent of diphenyl sodium 5-sulfoisophthalate as previously described is added to the initial reactants. The polymer has an inherent viscosity of 0.375 dl/g and a $T_g$ of 147° C.

The polymer is crystallized by mixing in 1.5 L of acetone for 2 hours. The crystalline polymer is collected by filtration and dried. The onset of melting occurs at 189° C. (24.9 J/g) and the peak of the endotherm is broad and located at 220° C.

EXAMPLE 9

Vacuum and Heat Treatment of Example 8 Polycarbonate

About 300 grams of the crystallized polymer described in Example 8 is tumbled and heated isothermally at 190° C. for 23 hours under vacuum (about 0.04 mm Hg) yielding a polymer with an inherent viscosity of 0.50 dL/g and a $T_g$ of 152° C. The onset of melting occurs at 235° C. (25 J/g) and the peak of the endotherm is narrow and located at 242° C.

EXAMPLE 10

Vacuum and Heat Treatment of Example 8 Polycarbonate

About 300 grams of the crystalline polymer described in Example 8 is tumbled under vacuum (about 0.04 mm Hg) and heated from 180° C. to 220° C. at 5° C. per hour and then held at 220° C. for 9 hours yielding a polymer with an inherent viscosity of 0.63 dL/g and a $T_g$ of 154° C. The onset of melting occurs at 239° C. (24 J/g) and the peak of the endotherm is narrow and located at 246° C.

EXAMPLE 11

Preparation of a Polycarbonate With 2 Mole Percent Diphenyl Sodium 5-Sulfoisophthalate Added to the Initial Reaction Mixture A polycarbonate is made using the procedure described in Example 2, except that 2 mole percent of diphenyl sodium 5-sulfoisophthalate as previously described is added to the initial reactants. The polymer has an inherent viscosity of 0.304 dL/g and a $T_g$ of 146° C. The polymer is slurried in 1 L of acetone and stirred for 2 hours. The crystalline polymer is collected by filtration and dried. The onset of melting occurs at 188° C. (21.4 J/g) and the peak of the endotherm is broad and located at 219° C.

EXAMPLE 12

Vacuum and Heat Treatment of Example 11 Polycarbonate

About 300 grams of the crystallized polymer described in Example 11 is tumbled and heated isothermally at 190° C. for 23 hours under vacuum (about 0.04 mm Hg) yielding a polymer with an inherent viscosity of 0.387 dL/g and a $T_g$ of 152° C. The onset of melting occurs at 241° C. (32 J/g) and the peak of the endotherm is broad and located at 249° C.

The sample is further tumbled under vacuum (about 0.04 mm Hg) and heated from 180° C. to 220° C. at 5° C. per hour and then held at 220° C. for 9 hours yielding a polymer with an inherent viscosity of 0.48 dL/g and a $T_g$ of 154° C. The onset of melting occurs at 269° C. (46 J/g) and the peak of the endotherm is narrow and located at 275° C.

EXAMPLE 13

Vacuum and Heat Treatment of Example 11 Polycarbonate

About 300 grams of the crystalline polymer described in Example 11 is tumbled under vacuum (about 0.04 mm Hg) and heated from 180° C. to 220° C. at 5° C. per hour and then held at 220° C. for 9 hours yielding a polymer with an inherent viscosity of 0.43 dL/g and a $T_g$ of 153° C. The onset of melting occurs at 262° C. (48 J/g) and the peak of the endotherm is narrow and located at 269° C.

EXAMPLE 14

Preparation of a Polycarbonate With 3 Mole Percent Diphenyl Sodium 5-Sulfoisophthalate Added to the Initial Reaction Mixture A polycarbonate is made using the procedure described in Example 2, except that 3 mole percent of diphenyl sodium 5-sulfoisophthalate as previously described is added to the initial reactants. The polymer has an inherent viscosity of 0.297 dL/g and a $T_g$ of 147° C.

The polymer is crystallized by mixing in 2 L of acetone for 2 hours. The crystalline polymer is collected by filtration and dried. The onset of melting occurs at 171° C. (13.6 J/g) and the peak of the endotherm is broad and located at 213° C.

EXAMPLE 15

Vacuum and Heat Treatment of Example 14 Polycarbonate

About 300 grams of the crystalline polymer described in Example 14 is tumbled under vacuum (about 0.04 mm Hg) and heated from 190° C. to 230° C. at 5° C. per hour yielding a polymer with an inherent viscosity of 0.42 dL/g and a $T_g$ of 151° C. The onset of melting occurs at 248° C. (14 J/g) and the peak of the endotherm is narrow and located at 254° C.

EXAMPLE 16

Preparation of a Polycarbonate With 5 Mole Percent Diphenyl Sodium 5-Sulfoisophthalate Added to the Initial Reaction Mixture A polycarbonate is made using the procedure described in Example 2, except that 5 mole percent of diphenyl sodium 5-sulfoisophthalate as previously described is added to the initial reactants. The polymer has an inherent viscosity of 0.195 dL/g and a $T_g$ of 129° C. The polymer is slurried in 3 L of acetone and stirred for 2 hours yielding a thick paste. The acetone is removed by evaporation and the crystalline polymer is dried. The onset of melting occurs at 198° C. (9.1 J/g) and the peak of the endotherm is broad and located at 217° C.

EXAMPLE 17

Vacuum and Heat Treatment of Example 16 Polycarbonate

About 300 grams of the crystallized polymer described in Example 16 is tumbled and heated isothermally at 190° C. for 23 hours under vacuum (about 0.04 mm Hg) yielding a polymer with an inherent viscosity of 0.45 dL/g and a $T_g$ of 163° C. The onset of melting occurs at 244° C. (22 J/g) and the peak of the endotherm is narrow and located at 254° C.

EXAMPLE 18

Vacuum and Heat Treatment of Example 16 Polycarbonate

About 300 grams of the crystalline polymer described in Example 16 is tumbled under vacuum (about 0.04 mm Hg) and heated from 190° C. to 230° C. at 5° C. per hour and then held at 220° C. for 9 hours yielding a polymer with an inherent viscosity of 0.61 dL/g and a $T_g$ of 168° C. The onset of melting occurs at 266° C. (24 J/g) and the peak of the endotherm is narrow and located at 274° C.

EXAMPLE 19

Preparation of a Polycarbonate With 10 Mole Percent Diphenyl Sodium 5-Sulfoisophthalate Added to the Initial Reaction Mixture A polycarbonate is made using the procedure described in Example 2, except that 10 mole percent of diphenyl sodium 5-sulfoisophthalate as previously described is added to the initial reactants. The polymer is slurried in 2 L of acetone and 700 mL of water and stirred for 2 hours yielding a thick paste. The solvent is removed by evaporation and the crystalline polymer is dried. The onset of melting occurs at 181° C. (18.3 J/g) and the peak of the endotherm is broad and located at 194° C.

EXAMPLE 20

Preparation of a Polycarbonate With About 5 Weight Percent Diphenyl Sodium 5-Sulfoisophthalate Added to the Initial Reaction Mixture A small kettle is filled with 1.5 grams diphenyl sodium 5-sulfoisophthalate and 30 grams of dry polycarbonate having a molecular weight average ($M_w$) of about 22,400, number average ($M_n$) of about 10,400 and containing about 1.3 part per million lithium hydroxide. The dry polycarbonate is prepared by a melt transesterification process. The kettle is evacuated and purged with nitrogen three times. The kettle is evacuated to a pressure of 0.1 millimeter of mercury and heated quickly to 325° C. using a molten salt bath. The contents of the kettle are stirred for 10 minutes at about 325° C. The vacuum in the kettle is relieved by venting nitrogen into the kettle. The resultant polycarbonate is clear and carbon NMR indicates that essentially all of the diphenyl sodium 5-sulfoiso-phthalate has been reacted to aromatic sulfonated moieties in the polycarbonate chain.

EXAMPLE 21

Preparation of a Polycarbonate by Reactive Extrusion With About 5 Weight Percent Diphenyl Sodium 5-Sulfoisophthalate Added to the Initial Reaction Mixture About 980 grams of a bisphenol A melt transesterified derived polycarbonate having a molecular weight average ($M_w$) of about 22,400, number average ($M_n$) of about 10,400 is tumbled with about 2.1 grams of epoxidized soybean oil for about 1 hour and then tumbled for 1 more hour with 49.6 grams of diphenyl sodium 5-sulfoisophthalate. The above mixture is dried for about 24 hours at about 110° C. The mixture is extruded using a Welding Engineers twin screw counter rotating extruder at a screw rpm of about 100. The extruder is kept at a temperature ranging from about 295° C. to about 325° C. The residence time in the extruder is about 70 seconds. The extruded polymer is passed through a water bath and chopped into pellets. Carbon 13 NMR indicates that about 50 percent of the diphenyl sodium 5-sulfoisophthalate has reacted and formed sulfonated aromatic moieties in the polymer chains.

COMPARATIVE EXAMPLE 1

Comparative Example 1 is a commercially available linear aromatic polycarbonate derived from bisphenol A and a carbonate precursor as described herein. This particular polycarbonate has a melt flow of 80 as determined by ASTM D 1238.

COMPARATIVE EXAMPLE 2

Comparative Example 2 is a commercially available linear aromatic polycarbonate derived from bisphenol A and a carbonate precursor as described herein. This particular polycarbonate has a melt flow of 15 as determined by ASTM D 1238.

COMPARATIVE EXAMPLE 3

Comparative Example 3 is a commercially available branched aromatic polycarbonate derived from bisphenol A, a carbonate precursor and a trihydric compound as described herein. This particular polycarbonate has a melt flow of 3 as determined by ASTM D 1238.

INJECTION MOLDING OF EXAMPLE AND COMPARATIVE EXAMPLE POLYCARBONATES

Injection molding of polycarbonate Examples 3, 4, 6, 7, 9, 10, 12, 13, 15, 17, 18 and Comparative Examples 1-3 into tensile specimens and impact disks is performed using an Arburg 170 CMD 150-45 injection molder maintaining a barrel temperature of 600° F. and a mold temperature of 200° F. Example 18 polycarbonate could not be injection molded with the apparatus and conditions described because its viscosity is too high.

TABLE 1

PHYSICAL PROPERTIES OF INJECTION MOLDED EXAMPLE AND COMPARATIVE EXAMPLE POLYCARBONATES

| Sample Name | DTUL (°C.) 264 psi load non-annealed | Vicat (°C.) | Tensile Yield Stress (psi) | Yield Elongation (%) | Break Stress (psi) | Elongation at Break (%) |
|---|---|---|---|---|---|---|
| Example 3 | 134.2 | 156.3 | 9061 | 4.4 | 8847 | 58.3 |
| Example 4 | 129.4 | 150.6 | 9369 | 4.4 | 7482 | 35.9 |
| Example 7 | 133.6 | 157.3 | 9018 | 4.5 | 9002 | 56.3 |
| Example 8 | 126.1 | 145.4 | * | * | 5752 | 1.6 |
| Example 9 | 132.6 | 154.5 | 9026 | 4.3 | 8899 | 65.7 |
| Example 10 | 132.2 | 155.0 | 8918 | 4.4 | 9010 | 64.2 |
| Example 12 | 130.5 | 154.1 | 9168 | 4.5 | 7980 | 45.2 |
| Example 15 | 128.1 | 150.1 | 9721 | 4.3 | 7772 | 10.0 |
| Example 17 | 134.9 | 162.1 | * | * | 7454 | 4.9 |
| Comparative Ex 1 | 130.5 | 150.3 | * | * | 5550 | 1.7 |
| Comparative Ex 2 | 130.9 | 152.9 | 8759 | 4.4 | 8890 | 74.0 |
| Comparative Ex 3 | 136.7 | 159.1 | 8783 | 4.4 | 8353 | 54.6 |

| Sample Name | Modulus (psi) | DYNATUP Load (lbs) | DYNATUP Energy Maxload (ft-lb) | DYNATUP Energy Total (ft-lb) | UL94 Flammability Classification |
|---|---|---|---|---|---|
| Example 3 | 362784 | 1605 | 45.7 | 65.8 | V-0 |
| Example 4 | 366907 | 1542 | 38.8 | 58.8 | * |
| Example 7 | 353238 | 1761 | 51.9 | 71.9 | * |
| Example 8 | 384902 | * | * | * | * |
| Example 9 | 368423 | 1596 | 46.0 | 63.9 | * |
| Example 10 | 360181 | 1713 | 50.4 | 69.7 | V-0 |
| Example 12 | 359793 | 1555 | 38.2 | 58.6 | V-0 |
| Example 15 | 393048 | 690 | 9.5 | 14.7 | V-0 |
| Example 17 | 381439 | 1614 | 35.8 | 55.5 | V-0 |
| Comparative Ex 1 | 364048 | 1273 | 36.0 | 50.7 | V-2 |
| Comparative Ex 2 | 354812 | 1625 | 46.7 | 67.1 | V-2 |
| Comparative Ex 3 | 354307 | 1793 | 56.7 | 74.7 | V-2 |

*Not Determined

The data in Table 1 are the results of testing done on the injection molded Examples and Comparative Example polycarbonates described herein. The data in Table 1 shows that the polycarbonate of this invention has similar mechanical properties as commercially available polycarbonates (Comparative Examples 1–3). The UL94 data in Table 1 shows that the polycarbonate of this invention has improved flame resistance compared to polycarbonate not having a sulfonated aromatic moiety in the polymer chain.

TABLE 2

CAPILLARY RHEOMETER DATA SHOWING NON-NEWTONIAN MELT FLOW OF POLYCARBONATE EXAMPLES AND COMPARATIVE EXAMPLES

| Sample | Viscosity (Poise) at Various Shear Rates | | | | |
|---|---|---|---|---|---|
| | 16.1 l/s | 53.6 l/s | 160.8 l/s | 536.0 l/s | 1608 l/s |
| Example 4 | 8100 | 5630 | 4110 | 3380 | 2380 |
| Example 9 | 4950 | 3200 | 3740 | 3910 | 3210 |
| Example 13 | 12300 | 10500 | 8290 | 5930 | 3440 |
| Example 15 | 7840 | 7430 | 6430 | 5010 | 3340 |
| Example 17 | 65600 | 62700 | 47600 | 23900 | |
| Example 18 | 405000 | 226000 | | | |
| Comparative Ex 1 | 1670 | 906 | 746 | 689 | 707 |
| Comparative Ex 2 | 3470 | 2930 | 2730 | 2640 | 2510 |
| Comparative Ex 3 | 18300 | 12900 | 9130 | 7140 | 4500 |

Melt rheology of polycarbonate Examples 4, 9, 13, 15, 17, 18 and Comparative Examples 1–3 are determined by capillary rheometry using an Instron 3211 capillary rheometer having a capillary length of 1.0048 inches and a diameter of 0.0302 inch at a temperature of 300° C. using the method described in ASTM D 1703. Table 2 shows the results of the capillary melt rheometry.

It is advantageous for forming techniques such as blow molding to have a high melt viscosity at low shear rate (e.g., the viscosity at a shear rate of 16.1 reciprocal seconds in Table 2) and non-Newtonian melt rheology or more specifically shear thinning melt rheology (decreasing viscosity with increasing shear rate). Because melt rheology is a complex function of variables such as temperature, polymer molecular weight, polymer molecular weight distribution and chemistry, the extent of shear thinning behavior will only be simplistically discussed. The ratio of a low shear viscosity to a high shear viscosity herein (e.g. 16.1 and 1608 reciprical second shear rates in Table 2) will be used to compare the shear thinning behavior of the polycarbonate examples.

The results show that the linear aromatic polycarbonates of this invention have greater viscosity at low shear rates even at low additions of the diphenyl sodium 5-sulfoisophthalate (0.5 mole percent) than linear aromatic polycarbonate having sulfonated aromatic moieties as shown by the viscosity of Example 9 compared to Comparative Examples 1 and 2 at a shear rate of 16.1 reciprical seconds. Comparative Examples 1 and 2 are linear aromatic polycarbonates having the same chain chemistry (product of Bisphenol A and a carbonate precursor "phosgene") without sulfonated aromatic moieties. The effect of the sulfonated aromatic moieties on the rheology of a polycarbonate is best illustrated by comparing Comparative Example 2 to Example 4. Comparative Example 2 has a similar molecular weight average ($M_w$) as Example 4. Example 4 has a significantly greater low shear to high shear viscosity ratio compared to Comparative example 2. The greater ratio shows that the shear thinning behavior of a polycarbonate having sulfonated aromatic moieties is significantly more pronounced than a comparable polycarbonate without said moieties. The sulfonated ionic aromatic polycarbonate of this invention has advantageous rheological behavior compared to linear aromatic polycarbonate without sulfonated aromatic moieties.

Further, the results in Table 2 show that the rheology of the linear aromatic polycarbonate of this invention can have similar beneficial rheology of a branched polycarbonate as shown by comparing the rheological behavior of Example 13 and Comparative Example 3, a branched aromatic polycarbonate.

What is claimed is:

1. A sulfonated ionic aromatic polycarbonate comprised of a plurality of aromatic polycarbonate polymer chains, wherein at least one chain has a randomly positioned sulfonated aromatic moiety.

2. The sulfonated ionic aromatic polycarbonate of claim 1 wherein the sulfonated ionic aromatic polycarbonate is a linear polycarbonate.

3. The sulfonated ionic aromatic polycarbonate of claim 2 wherein the sulfonated ionic aromatic polycarbonate is a reaction product of bisphenol A, diphenyl carbonate and diphenyl sodium 5-isophthalate.

4. The sulfonated ionic aromatic polycarbonate of claim 1 wherein the sulfonated ionic aromatic polycarbonate is essentially immiscible in methylene chloride after 24 hours at 20° C.

5. The sulfonated ionic aromatic polycarbonate of claim 1 wherein the sulfonated aromatic moiety comprises about 0.1 to about 25 weight percent of the sulfonated aromatic polycarbonate.

6. The sulfonated ionic aromatic polycarbonate of claim 1 wherein the sulfonated aromatic moiety comprises about 1 to about 10 weight percent of the sulfonated ionic aromatic polycarbonate.

7. The sulfonated ionic aromatic polycarbonate of claim 1 wherein the sulfonated ionic aromatic polycarbonate is formed by reacting a mixture of at least one sulfonated aromatic diester and at least one aromatic polymer precursor mixture or polymer having transesterifiable groups, at a temperature above the melting point of the polymer or a member of the precursor mixture and at a pressure at most equal to atmospheric pressure.

8. The sulfonated aromatic polycarbonate of claim 7 wherein the sulfonated aromatic diester is soluble in at least one member of the aromatic polymer precursor mixture or polymer.

9. The sulfonated aromatic polycarbonate of claim 7 wherein the sulfonated ionic aromatic polycarbonate is crystallized and then heated so as to increase the molecular weight of the crystallized sulfonated polycarbonate.

10. The sulfonated aromatic polycarbonate of claim 7 wherein the reacting is conducted in the presence of a basic catalyst.

* * * * *